Patented Apr. 17, 1951

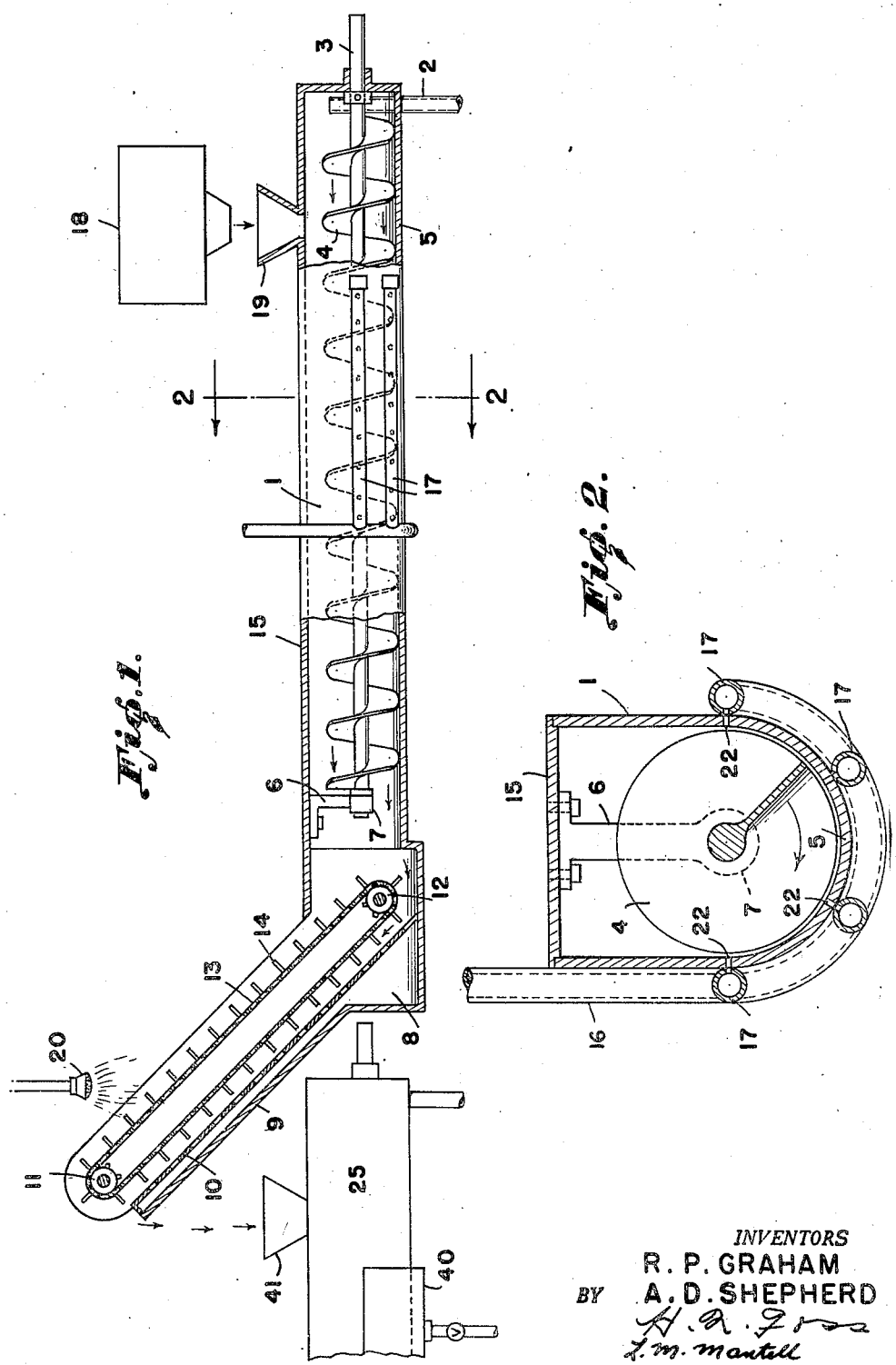

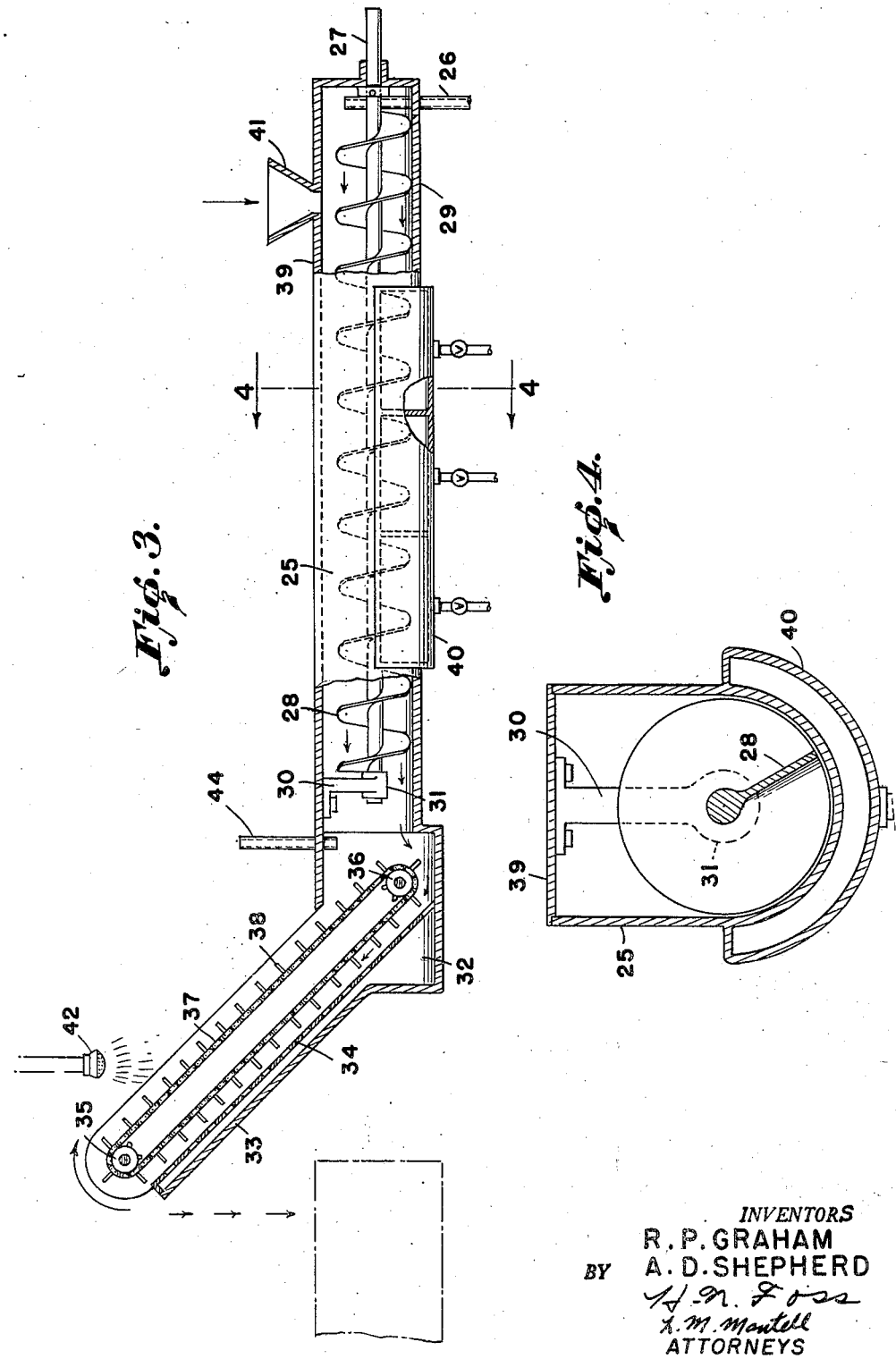

2,548,895

UNITED STATES PATENT OFFICE 2,548,895

EXTRACTION OF CITRUS PEEL

Robert P. Graham, Albany, and Allan D. Shepherd, El Cerrito, Calif., assignors to United States of America as represented by the Secretary of Agriculture Application November 25, 1947, Serial No. 788,076

3 Claims. (Cl. 260—209.5)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to the extraction of citrus peel by a novel continuous process.

The conventional method for extracting pectin from citrus peel involves a batch procedure in which the peel is disintegrated by heat and mechanical devices in the presence of dilute acid. The resulting material is a slimy mass containing much finely divided solid material and is very difficult to filter. Paper pulp is often added to the batch to reduce the slimy character of the mass. The difficulty of filtration limits the concentration of pectin in the extract and thus is a serious barrier to economical procedure. Thus, in order to obtain an extract which can be filtered at a reasonable rate, the extract must be kept very dilute with respect to its concentration of pectin. Some producers of pectin have to use concentrations as low as 0.3% of pectin in the extract in order to obtain a filterable extract. This low pectin content necessitates filtering large quantities of liquid and requires costly procedures to obtain the dry pectin. The industry has long recognized the disadvantages of having to keep the pectin concentration at a low level, but there has been no successful solution for this problem.

It has now been discovered that the disadvantages specified above can be eliminated if the citrus peel is moved slowly through an extraction zone and contacted with a countercurrent stream of dilute mineral acid. The citrus peel is supplied to the extractor in discrete pieces and these pieces are not completely disintegrated in proceeding through the system. In this manner the formation of fine or colloidal material is avoided and the extract is readily filterable to yield a filtrate of high clarity. Proceeding in this manner filtration rates as high as 15 to 25 gallons per hour per square foot have been obtained at room temperature with a pectin concentration of 0.75 to 0.80%.

It has also been found that the peel can be subjected to a washing treatment, in the same general manner as in the extraction, to yield a washed peel which can be readily extracted to give easily filterable extracts. Thus in the washing step, the cut peel is slowly moved through a washing zone while it is contacted with a countercurrent stream of water. In its passage through the water the peel is subjected to steam treatment whereby it is blanched. By proceeding in this manner the peel is thoroughly washed and blanched while avoiding the formation of fine colloidal peel material. This washed peel is in eminently suitable condition for the extraction step because it is relatively free from fine particles.

It has also been found that if the washed peel is dried before being extracted, the extract has a filtration rate approximately twice as high as when the peel is extracted immediately after washing.

It is to be understood, however, that the novel extraction process herein described has advantages in and of itself and it is within the purview of this invention to apply the extraction process to citrus peel, regardless of previous treatment of the peel. Thus the novel countercurrent extraction process has advantages, per se, and may be applied to fresh untreated peel; dried fresh peel; peel which has been blanched, washed, and dried; peel which has been blanched and washed; peel which has been washed and dried; peel which has been washed; peel which has been blanched and dried; or peel which has only been blanched.

An object of this invention is to provide a method of extracting citrus peel wherein the citrus peel is slowly moved through an extraction zone while being contacted with a countercurrent stream of dilute acid.

Another object of this invention is to provide a method of extracting citrus peel wherein dry citrus peel is slowly moved through an extraction zone while being contacted with a countercurrent stream of dilute acid.

A further object of this invention is the provision of a method for preparing pectin extract from citrus peel by slowly moving citrus peel through a zone where it is blanched and contacted with a countercurrent stream of water, then moving the peel through an extraction zone while being contacted with a countercurrent stream of dilute acid.

A still further object of this invention is the provision of a process of preparing pectin extract from citrus peel by slowly moving citrus peel through a zone where it is blanched and contacted with a countercurrent stream of water, drying the peel, then moving the dried peel through an extraction zone while being contacted with a countercurrent stream of dilute acid.

Further objects and advantages will be evident from the description of the processes embodied in this specification.

Design of the washing and extracting units, selection of mechanical accessories, and position of the various parts of the apparatus are matters in which wide freedom of choice may be exercised. It has been found, however, that the washing and extracting steps can best be carried out in the devices illustrated in the drawing.

Figure 1 represents a side view of the washing unit. The side of the unit at each end has been cut away as represented by the broken lines to show the inside of the unit.

Figure 2 represents a cross section of the washing unit taken through the plane 2—2.

Figure 3 represents a side view of the extractor unit. The side of the unit at each end has been cut away as represented by the broken lines to show the inside of the unit.

Figure 4 represents a cross section of the extractor unit 25 taken through the plane 4—4.

The apparatus and its functions are described as follows:

The washing unit 1 is shown in Figures 1 and 2. Trough 5 has a U-shaped cross-section and is positioned in a horizontal plane with a slight tilt, the end near hopper 19 being somewhat lower than the other end. The trough 5 is provided with an overflow pipe 2, preferably adjustable in height, for removal of wash water. Within the trough 5 is positioned a screw 4 attached to shaft 3. This shaft 3 is positioned at one end by strut 6 and bearing 7, and at the other end by the end of trough 5. Shaft 3 is provided at its protruding end with a suitable device such as an electric motor (not illustrated) for rotating it in such direction as to cause it to move material toward the sump end of the trough. Trough 5 is provided with a sump 8 for accumulation of the solid material which is removed from the trough by a conveyor system. This system consists of a flat chain 13 supported on rolls 11, 12. The rolls 11, 12 are rotated clockwise by suitable device such as an electric motor (not illustrated). The chain 13 is equipped with rakes 14 which serve to trap the solid material and cause it to be moved up and out between rakes 14 and perforated plate 10. Liquid carried with the solid material runs through plate 10 and down sloping plate 9 back into the trough. The trough 5 is preferably covered with a top 15 to reduce consumption of steam. Steam pipes 17 are provided for introduction of steam into the material within the trough. These pipes 17 are equipped with perforations 22 to allow passage of steam directly into the trough. Steam pipes 17 are connected to a suitable source of steam 16. A hopper 19 is provided for introduction of vegetable material into the washing unit. A cutting device 18 is positioned over hopper 19 so that the cut material can be directly introduced into the hopper 19. A nozzle 20 is provided for spraying the solid material leaving the trough on chain 13 with water, which water flows into trough 5 and serves as the washing agent.

The extractor unit 25 is shown in Figures 3 and 4. Trough 29 has a U-shaped cross-section and is positioned in a horizontal plane with a slight tilt, that is, the end near hopper 41 is somewhat lower than the other end. The trough 29 is provided with an overflow pipe 26, preferably adjustable in height for removal of the extract. Within trough 29 is positioned a screw 28 attached to shaft 27. This shaft 27 is positioned at one end by strut 30 and bearing 31 and at the other end by the end of trough 29. Shaft 27 is provided at its protruding extremity with suitable device such as an electric motor (not illustrated) for rotating it in such direction as to cause it to move material toward the sump end of the trough. Trough 29 is provided with a sump 32 for accumulation of the solid material which is removed by a conveyor system. This system consists of a flat chain 37 supported on rolls 35, 36 which rolls are rotated clockwise by suitable device such as an electric motor (not illustrated). The chain 37 is equipped with rakes 38 which serve to trap the solid material and cause it to be moved up between rakes 38 and perforated plate 34. Liquid carried with the solid material flows through plate 34 and onto sloping plate 33 which serves to return the liquid to the trough. Trough 29 is preferably covered with a top 39 to reduce consumption of steam. Steam jacket 40 is provided for heating the contents of the trough. Preferably, this steam jacket is separated into 3 sections with separate valves and sources of supply. In this manner more accurate control of heat is possible. A hopper 41 is provided for introducing the solid material into the extractor. A nozzle 42 is provided for spraying the solid material leaving the trough between chain 37 and perforated plate 34 with water. This water then flows into trough 29. Pipe 44 serves to introduce acid or other reagent into trough 29.

The operation of the process is explained in connection with treatment of citrus peel to prepare a pectin extract, as follows:

Citrus peel is introduced into cutter 18 where the peel is sliced. This device is preferably a circular, rotary knife cutter. The cut peel is directly introduced into washing unit 1 through hopper 19. The screw 4 is rotated so as to move the comminuted peel toward the sump end of trough 5. Water is introduced into the system through nozzle 20. Steam is introduced through pipes 17 and orifices 22 to blanch the peel, i. e., to inactivate the de-methoxylating enzymes present in the peel. The peel is gradually moved through trough 5 while it is washed by the countercurrent stream of water. The wash liquor is removed through overflow pipe 2 and is discarded. The washed peel gathering in sump 8 is lifted out of the ssytem by chain conveyor 13 where it is given a final wash with the water entering the system. The washed peel which drops off the conveyor 13 can be immediately extracted for recovery of pectin. It has been found that higher filtration rates can be obtained if the peel is first dried before extraction. If this alternative method is used, the washed peel is first passed through pressing rolls or excess water removed in a screw press. The partially dehydrated peel, about 12% solids, is then dried in the sun, or by passing through a rotary kiln, or dried in an oven to about 90% solids. It was observed that when the washed peel is dried and then extracted, the filtration rate of the extract was twice as fast as that obtained from wet peel directly from the washing step. It was also found that rapid drying gives better results than slow drying, as the rapidly dried peel is more porous and more readily rehydrated.

The peel directly from the washing unit or dried peel) is then introduced into the extractor 25 through hopper 41. Screw 28 is rotated in such direction as to move the peel toward the sump end of trough 29. Water is sprayed from nozzle 42 onto the pulp leaving the system on chain 37. This water serves to wash the pectin extract off the peel and also runs into the trough and acts as the extracting medium. Acid is introduced through pipe 44. The amounts of water and acid are regulated to give the correct proportion for proper extraction. Steam is introduced into jacket 40 to bring the reactants to the proper temperature. The peel is gradually moved through trough 29 while it is extracted by the countercurrent stream of dilute acid. The extract is removed from the system through overflow pipe 26. The extracted peel gathering in sump 32 is lifted out of the system by chain conveyor 37, where it is given a final wash by the water entering the system. The extracted peel drops off the end of chain conveyor 37.

The following examples illustrate particular conditions and techniques found to be particularly advantageous. It is to be understood that the examples are submitted by way of illustration and not limitation, since as stated elsewhere in this specification many modifications may be employed. In Examples 1 to 4, part (a) of each, the washing unit was as described in Figures 1 and 2. The screw had a diameter of 6 inches, a length of 10 feet, and a pitch of 2 inches. The washing was done with cold water, and live steam was introduced near the entrance of the washer to blanch the peel. The tank was tilted so that it was about 1 inch higher at the sump end than at the hopper end. In Examples 1 to 4, part (b) of each, the extracting unit was as described in Figures 2 and 4. The screw had a diameter of 6 inches, a length of 10 feet, and a pitch of 2 inches. The temperature was maintained at about 212° F. at the sump end of the tank at about 180° F. in the middle section, and about 160° F. at the hopper end thereof. The tank had a slight tilt, the sump end being about 1 inch higher than the hopper end. In both washing and extracting operations, the speed of rotation of the screw was so regulated as to move the peel through the system at the rate indicated in the example.

EXAMPLE 1

(a) Washing procedure

Three hundred and sixty-one lbs. of Valencia orange peel was cut in 5/32" strips and washed with 4 times its weight of water for ½ hour in the countercurrent washing unit. The washed peel was roller pressed, yielding 400 lbs. of product. The following results were obtained:

|  | Fresh Peel | Washed Peel |
|---|---|---|
| Per Cent Solids | 23.9 | 12.3 |
| Per Cent Pectin (wet basis) | 4.5 | 3.8 |
| Per Cent Pectin (dry basis) | 18.6 | 31.2 |

(b) Extraction

The pressed peel of part (a) was dried in an oven at 150–170° F. Fifteen lbs. of the dried peel was extracted in the countercurrent extractor with dilute sulphuric acid (1.5 cc./liter) in the ratio of 5 parts of dilute acid to 1 part of peel (based on the original fresh peel). Dried peel was added at the rate of 36 lbs./hour and dilute acid at 150 lbs./hour. The exit pulp weighed 95 lbs. and about 45 gallons of pectin extract was obtained. The following results were noted:

|  | Exit pulp | Extract |
|---|---|---|
| Per cent Pectin | 1.13 | 0.8 (optical), 0.78 (alcohol ppt.). |
| Per cent Solids | 6.9 | |

Pectin balance

Pectin in feed peel _____ lbs. 4.35
Pectin in exit pulp _____ lbs. 1.06
Pectin extracted _____ per cent 76

EXAMPLE 2

(a) Washing procedure

Two hundred and thirty-three lbs. of Valencia orange peel was shredded into 5/32" strips in the rotary cutter and washed in the countercurrent washing unit at a rate of 60 lbs./hr. with 2.5 times its weight of water. The washed peel was pressed. Yield, 268 lbs.

(b) Extraction

The pressed peel from part (a) was extracted in the countercurrent extractor with dilute sulphuric acid (1.5 cc. $H_2SO_4$/liter). The peel was fed at the rate of 30 lbs./hr. with an acid rate of 95 lbs. dilute acid/hr. The resulting extract had a pH of 1.75 and a pectin content of 0.8%. A total of 187 lbs. of peel was fed and 150 lbs. of pulp obtained. The following results were noted:

|  | Fresh peel | Washed peel | Exit peel |
|---|---|---|---|
| Per cent Solids | 24.1 | 11.7 | 6.8 |
| Per cent Pectin (wet basis) | 4.09 | 3.93 | 1.25 |
| Per cent Pectin (dry basis) | 16.95 | 33.5 | 18.5 |

Pectin balance

Pectin in washed peel _____ lbs. 7.36
Pectin in exit peel _____ lbs. 1.87
Pectin extracted _____ per cent 74.5

EXAMPLE 3

(a) Washing procedure

Two hundred and seventy-five lbs. of sliced Valencia orange peel was blanched with live steam and washed in the previously mentioned washing unit for ½ hr. with 2¼ times its weight of cold water. The peel was fed at the rate of 1 lb./min. The washed peel was roller pressed to obtain 290 lbs. (11.7% solids) of wet peel.

(b) Extraction

The peel from part (a) was extracted in the countercurrent extractor under the following conditions:

Peel feed rate _____ lbs./min. 30
Acid feed rate _____ cc./min. 568
Weight of feed _____ lbs. 114
Weight of waste feed _____ lbs. 98

The following results were obtained:

|  | Fresh peel | Washed peel | Exit peel |
|---|---|---|---|
| Per cent Solids | 27.8 | 11.7 | 7.4 |
| Per cent Pectin (wet basis) | 1.6 | 2.2 | .92 |
| Per cent Pectin (dry basis) | 5.76 | 18.8 | 13.7 |

Pectin recovered = 64%.

The extract contained 0.80% pectin. This extract was filtered, with the addition of 0.5%

"Hyflo," a refined diatomaceous earth filter-aid, on a filter press which had been given a precoat with the same filter-aid. The filtrate was then filtered in the presence of 0.25% "Speedflow," a refined diatomaceous earth filter-aid, on a filter press which had been precoated with the same filter-aid. The filtrate was measured for its turbidity on a Lumetron photometer and a reading of 94.5 was obtained.

(c) (Not according to this invention)

A batch extraction was carried out on some of the washed peel from part (a) in order to compare the batch and countercurrent extraction methods. To this end 15 lbs. of the washed peel was digested with 45 lbs. of water, 10.5 oz. paper pulp, and 50 cc. concentrated sulphuric acid for 0.5 hour at 95° C. Thirty-two lbs. of extract was obtained (0.9% pectin). This extract was filtered on the same press as was used in part (b) in the presence of 1% "Hyflo," the press being precoated with the same filter-aid. The filtrate was then filtered in the presence of ½% "Speedflow" on the press precoated with the same filter-aid. The resulting filtrate had a turbidity reading of 159 as measured on the Lumetron photometer.

A comparison of parts (b) and (c) indicates that despite the addition of paper pulp and more filter-aid, the extract from the batch process contained much more non-filterable material than the extract derived in the countercurrent extraction.

In the extraction of pectin-containing material to prepare pectin extract, many variables are possible. The material extracted can be orange peel, lemon peel, grapefruit peel, or other citrus peel. The peel must be in the form of narrow strips. It has been found that best results are obtained when the peel is cut into strips from 1/16" to ¼" wide. This width dimension is important to obtain proper diffusion of the solvent through the peel. If the strips are wider than ¼", diffusion is so slow as to prevent proper extraction within a reasonable time. If the strips are narrower than 1/16", the factor of packing is involved. When such narrower strips are used, the cut peel packs in the extractor, and proper flow of the solvent through the individual strips is prevented. The length of the strips may be varied. It is preferred to use strips having an average length of ¾".

As previously indicated, the citrus peel is preferably blanched and washed by the countercurrent process described herein in order to get the best results. Likewise drying of the washed material before extraction has been found to yield an extract more easily filtered. However, the countercurrent extraction gives improved results over the prior art extraction methods. Our invention includes application of the countercurrent extraction to peel, regardless of prior treatment. The pectin-containing material is generally washed with cold water in the countercurrent washing unit. Live steam is introduced only near the hopper end of the tank to blanch the material but the amount of steam is not so high as to materially raise the temperature of the liquid in the washing section of the tank. In the case of grapefruit peel, the wash water should be warm to extract the bitter constituent (naringin) of the peel.

In the extraction step many variables are possible. The extraction time should be about ½ to 2 hours, preferably about 1 hour. The sulphuric acid concentration should be from 1 to 4 cc./liter to give a pH of 1.0 to 2.0. A pH of about 1.5 is preferred. Other mineral acids such as hydrochloric, phosphoric, etc. can be used at the same pH as above. The temperature of extraction can be varied within fairly wide limits. A temperature of about 180–212° F. gives good results. Preferably the sump end of the tank is kept at boiling temperature (212° F.) whereby agitation is obtained while the midsection of the tank is maintained at 190–200° F. and the hopper end of the tank maintained at about 160° F. The ratio of dilute acid to pectin-containing material (on a fresh-peel basis) should be from 2 to 4 parts by weight of dilute acid to each part by weight of the pectin-containing material, preferably in the ratio of 3 to 1. When wet peel is used directly from the washing step, a less amount of aqueous acid is used; when dry peel is extracted, more aqueous acid is necessary, since sufficient water must be added to reconstitute the dry peel into wet peel.

The drawing illustrates the apparatus found to be most suitable to carry out the process. However, it is to be emphasized that it is not essential to use this construction. Other forms of apparatus employing the same principles of operation could be adapted to perform the countercurrent extraction, now that these principles have been demonstrated herein. The material being removed from the system need not be carried out on a belt conveyor. A screw conveyor operating in an open trough would also be suitable. The steam heating means could be replaced by other heating devices, for instance, electrical heating devices. The simple hoppers (19 and 41) could be replaced by screw feeders or belt conveyors to introduce the material into the system.

The liquid level within the trough should be from slightly below the top of the screw down to the shaft level. If the level is maintained much below the top of the screw, the flights should be perforated to permit free passage of the liquid.

Where a screw conveyor is used to move the peel through the extraction zone, the angle of the helix (measured from a plane perpendicular to the axis) should be small so that the peel will be moved substantially longitudinally with respect to the axis of the screw. If this angle is made too large there will be considerable lifting and rotation of the peel by the flights in addition to the regular longitudinal movement. This is particularly true in the section of the trough near the hopper end where the contents of the trough is viscous. This lifting and rotation of the peel is to be avoided as much as possible, since it interferes with the proper flow of the peel countercurrent to the stream of solvent. It causes particles of peel to be moved by the stream of solvent in the same direction as the stream is moving.

Having thus described our invention, we claim:

1. A counter-current process for obtaining an extract having a pectin concentration of higher than about 0.3 percent and having a relatively high filtration rate, comprising slowly passing citrus peel, dried to at least about 90% solids and in the form of strips from about 1/16 inch to about ¼ inch in width, through an elongated path in a body of dilute aqueous mineral acid with a minimum of disintegration of the peel, the peel and the aqueous acid moving in opposite directions, and removing the extract toward one end of the body and the peel toward the other.

2. The process of claim 1 in which, prior to the extraction, the peel strips are washed in water and blanched with steam, pressed to remove some of the water, and then subjected to quick drying.

3. A counter-current process for extracting pectin from citrus peel comprising slowly moving the peel which is in the form of strips having a width from about $\frac{1}{8}$ inch to about $\frac{1}{4}$ inch, with a minimum of disintegration, through an elongated path in a body of water, the peel and the water moving in opposite directions, removing the peel, pressing water therefrom, rapidly drying the peel to at least about 90% solids, slowly passing the dried peel through an elongated path in a body of dilute aqueous mineral acid, the peel and the aqueous acid moving in opposite directions, with a minimum of disintegration of the peel, to obtain an extract having a high filtration rate, and filtering the extract.

ROBERT P. GRAHAM.
ALLAN D. SHEPHERD.

REFERENCES CITED

The following references are of record in the file of this patent:

UNITED STATES PATENTS

| Number | Name | Date |
|---|---|---|
| 608,363 | Eichelbaum | Aug. 2, 1898 |
| 1,385,525 | Doell et al. | July 26, 1921 |
| 1,497,884 | Jameson et al. | June 17, 1924 |
| 2,107,537 | Jones et al. | Feb. 8, 1938 |
| 2,387,165 | Metzner | Oct. 16, 1945 |
| 2,455,382 | Nelson | Dec. 7, 1948 |